US009639378B2

(12) United States Patent
Goossens et al.

(10) Patent No.: US 9,639,378 B2
(45) Date of Patent: *May 2, 2017

(54) EXTENSIBLE 3D ASSET PLUG-IN FRAMEWORK

(71) Applicant: Apple Inc., Cupertino, CA (US)

(72) Inventors: Thomas Goossens, Paris (FR); Amaury Balliet, Paris (FR); Aymeric Bard, Paris (FR)

(73) Assignee: Apple Inc., Cupertino, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/292,666

(22) Filed: May 30, 2014

(65) Prior Publication Data

US 2015/0347104 A1 Dec. 3, 2015

(51) Int. Cl.
*G06F 9/45* (2006.01)
*G06F 9/445* (2006.01)
*G06T 15/00* (2011.01)

(52) U.S. Cl.
CPC .......... *G06F 9/44526* (2013.01); *G06T 15/00* (2013.01); *G06T 2210/32* (2013.01)

(58) Field of Classification Search
CPC ......... G06T 19/00; G06T 17/20; G06T 17/00; G06T 15/10; G06T 15/00; G06T 2210/32; G06F 9/44526
See application file for complete search history.

(56) References Cited

U.S. PATENT DOCUMENTS

| 8,456,467 | B1 | 6/2013 | Hickman et al. |
| 8,612,040 | B2 | 12/2013 | Thomas et al. |
| 2008/0049015 | A1 | 2/2008 | Elmieh et al. |
| 2013/0286025 | A1 | 10/2013 | Spells, III et al. |
| 2013/0336640 | A1 | 12/2013 | Nevarez et al. |
| 2015/0348305 | A1* | 12/2015 | Goossens .................. G06T 5/00 345/419 |

OTHER PUBLICATIONS

Gang Chen, Shang Xiang, Guanqun Ji, and Quan Ding, Scene Simulation Platform Based on Data Fusion on Multiple Format 3D Models, ICCMS, IEEE, 2009, pp. 342-346.

* cited by examiner

*Primary Examiner* — Todd Buttram
(74) *Attorney, Agent, or Firm* — Blakely, Sokoloff, Taylor & Zafman LLP

(57) ABSTRACT

An extensible three-dimensional (3D) asset plug-in framework is disclosed. In various embodiments, files having different 3D file formats may be processed by respective plug-ins. The plug-ins may be configured to be downloaded and installed, to receive input files describing one or more 3D models and having a respective 3D file format, to read the respective 3D file format, and to generate and return a common 3D description to be previewed and manipulated by an application or an operating system. The different 3D file formats and their respective plug-ins may be proprietary or developed by third parties.

18 Claims, 13 Drawing Sheets

EXTENSIBLE 3D ASSET PLUG-IN FRAMEWORK

BACKGROUND

The present disclosure relates generally to three-dimensional (3D) assets and, more particularly, to previewing, manipulating, and/or enhancing 3D assets.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Operating systems, file manager applications, and/or other computer applications may include functionality for previewing the contents of files. This allows a user to quickly inspect the contents of a particular file in a viewer without actually opening the file. However, the file formats that are supported by this functionality may be limited. In particular, the operating system, file manager, and/or other applications may be incapable of reading the file formats of 3D assets—especially when the 3D assets are in different file formats from various different third-party developers. As a result, the operating system and/or applications may be incapable of previewing and/or manipulating the 3D assets.

Nevertheless, end-users and software developers may desire to utilize 3D assets. For example, a software developer may desire to use 3D assets in the applications they write for embedded devices, such as smart phones and tablets, and/or laptop or desktop computers. Developer assets in an integrated development environment may be rendered and included in an application bundle when the application is compiled and built. However, because 3D assets may be large files, stored in inefficient file formats, and may refer to ambiguous file paths, among other things, the applications that call upon the 3D assets during runtime may perform poorly.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for system-wide previewing and manipulating of any type of three-dimensional (3D) file format and automatically enhancing 3D assets utilized in applications at build time so that the 3D assets may perform better at runtime. A framework is provided that enables a software developer to create a unique 3D file format and a plug-in that is configured to read and convert the unique 3D file format. In some embodiments, the plug-in may be installed by a plug-in architecture for an operating system running on a device and/or computer. By separating the process for implementing the plug-in from a particular application, the plug-in may be available for use at a system-wide level. However, in other embodiments, the plug-ins may be installed by individual applications that request to process files having the unique 3D file format.

After being implemented and installed, the plug-in may be called upon by an application to process a file having the unique 3D file format. As a result, the plug-in may accept or retrieve the 3D file having the unique file format, convert it to a common 3D description, and return the common 3D description having a uniform file format that is understood by an operating system (OS), such as iOS or OS X by Apple Inc., and/or an application, such as QuickLook, SceneKit, Preview, Xcode, and/or Finder by Apple Inc. The OS and/or the application may preview the commonly described 3D representation in a viewer. Additionally or alternatively, the OS and/or application may enable manipulating the commonly described 3D representation.

If the software developer decides to utilize a 3D asset when writing an application using an integrated development environment (IDE), such as Xcode by Apple Inc., the techniques disclosed herein enable enhancing that 3D asset at build time so that it may perform better at runtime. For example, as long as the plug-in that recognizes a unique 3D file format is installed in the operating system and/or application, the developer can preview and manipulate the 3D asset having the unique 3D file format in the IDE and select the 3D asset as part of the application.

Once the developer builds the application, various enhancements may be performed to the 3D asset during build-time, including converting the 3D file format for a target environment, unifying the orientation of 3D models in the 3D asset, converting image format, interleaving 3D geometries, resolving ambiguous file path references, among others. In some embodiments, these enhancements may be performed by the plug-ins when reading the 3D asset. As may be appreciated, benefits of the disclosure may include, among others, providing an extensible framework where any number of 3D file formats may be converted to a common 3D description that may be previewed and/or manipulated by the OS and/or applications running the associated plug-in. Further, better performing applications may be created by enhancing 3D assets utilized in the applications at build-time so that they may perform faster and/or more reliably at runtime.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
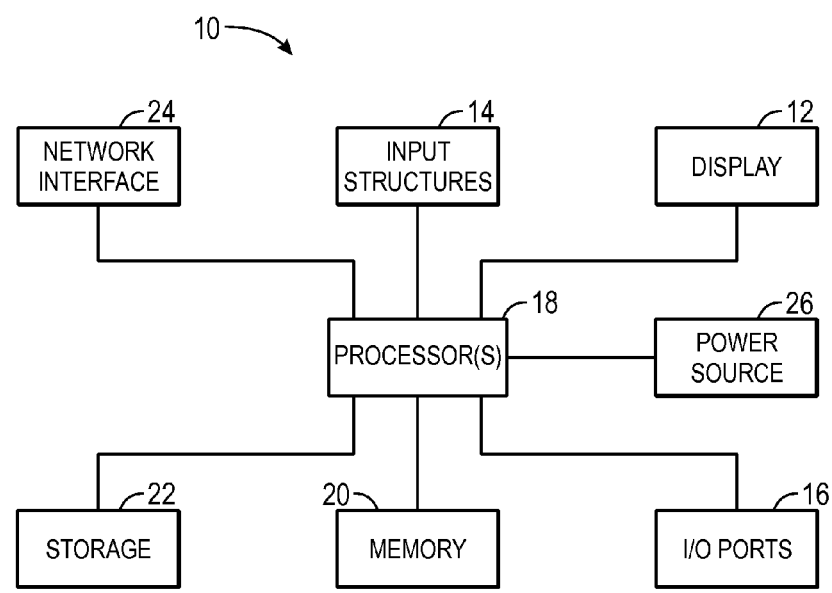
FIG. 1 is a block diagram of an electronic device that may use the techniques disclosed herein, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. It should be noted that the techniques disclosed herein may apply to any operating system, including operating systems for embedded devices (e.g., iOS by Apple Inc.) and computers (e.g., OS X®). It should also be noted that "three-dimensional (3D) asset" may generally refer to a file including one or more descriptions of a 3D model and having a particular 3D file format. The 3D file format may be proprietary or created by a third party.

A developer may desire to create a new 3D file format for any number of reasons, such as improving performance of the 3D file by using a different data schema, encoding type, compression, and so forth. However, the newly created 3D file format may be unsupported by various operating systems (OS) and/or applications. That is, the new 3D file format may not be natively recognized by the operating systems and/or applications. As a result, the OS and/or applications may be incapable of reading, previewing, and/or manipulating the new 3D file format. Further, utilizing a 3D asset having the new 3D file format, or any 3D file format for that matter, in an application may perform poorly because any enhancements that are done, such as mapping file path references to other 3D assets and the like, generally take place during runtime. This may result in a slow loading or sluggish application.

Accordingly, embodiments of the present disclosure relate to providing an extensible framework that enables operating systems and/or applications to preview and/or manipulate 3D assets having any kind of file format by utilizing a respective plug-in. Indeed, the framework enables a developer to create a new 3D file format as desired and a respective plug-in configured to read a 3D asset having the new 3D file format. Plug-ins may add functionality by altering the base image of the OS and/or application. A user may download and install the plug-in and the operating system and/or the application may be enabled to read the new 3D file format. More specifically, the plug-in may accept or retrieve the 3D asset having the 3D file format that it is configured to read, convert the 3D asset to a common 3D description understood by the target environment, and output the commonly described 3D representation to the OS and/or the application. Further, in certain embodiments, 3D assets with differing file formats that are selected for use in an application may be enhanced during build-time by a build-time file enhancer, or the like, to increase performance at runtime.

For example, if a developer is utilizing an integrated development environment (IDE), such as Xcode by Apple Inc., to write an application for an embedded device running a light OS, such as iOS by Apple Inc., the developer may select a 3D asset from a list of 3D assets all having different 3D file formats. If the OS or the IDE has installed the plug-in configured to read the selected 3D asset's file format, the 3D asset may be previewed and/or manipulated in a viewer of the IDE. If the appropriate plug-in for a specific 3D file format is not installed, then the IDE may contact an online application store, such as the App Store by Apple Inc., and search for the appropriate plug-in to download and install. Further, if the user builds the application, the techniques described herein may convert the 3D assets having non-natively recognized 3D file formats to common 3D descriptions using their respective plug-ins and enhance the common 3D descriptions during build-time using the build-time file enhancer so that the 3D assets may perform better during runtime.

Figure 2:
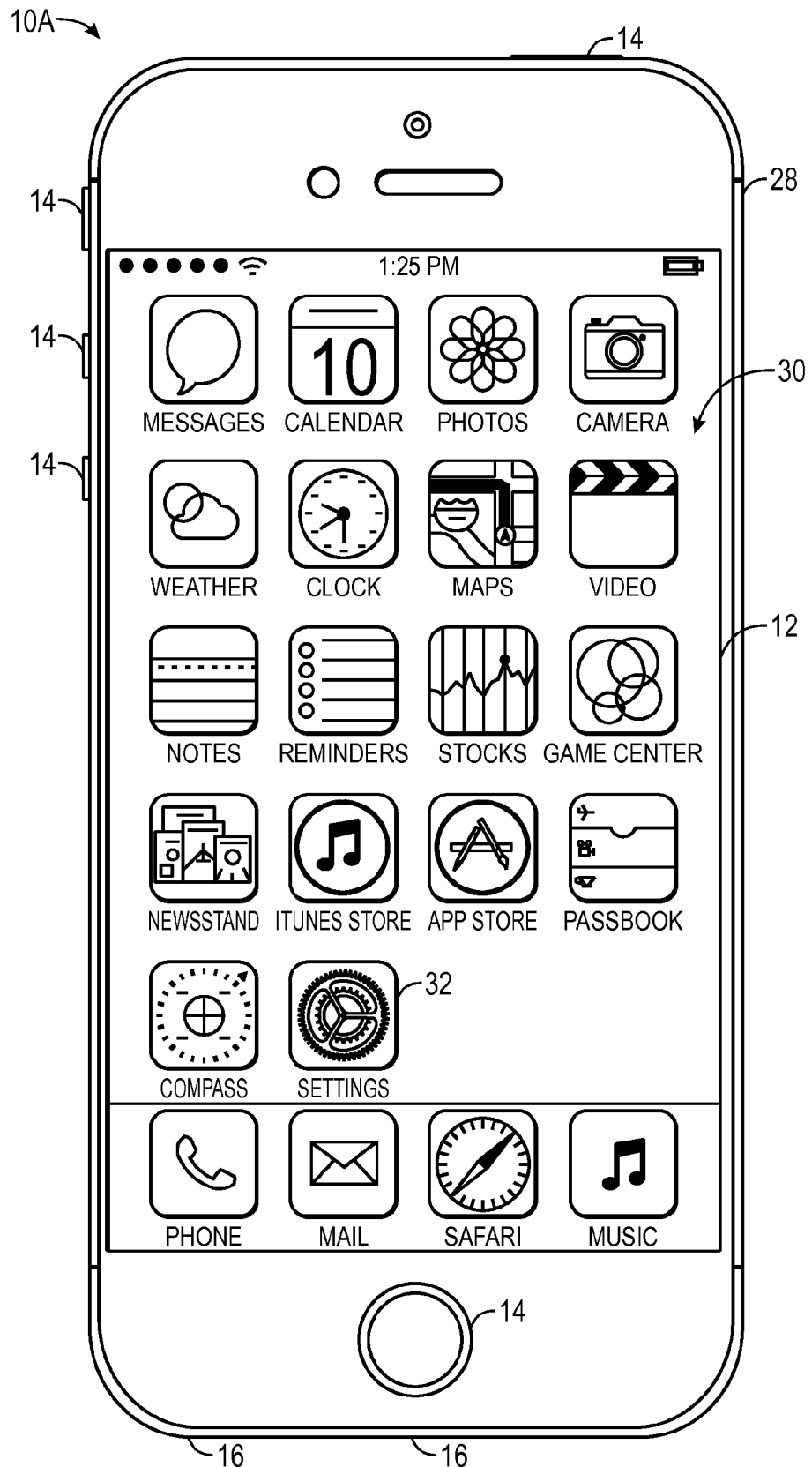
FIG. 2 is a front view of a handheld device, such as an iPhone® by Apple Inc., representing an example of the electronic device of FIG. 1.
Figure 3:
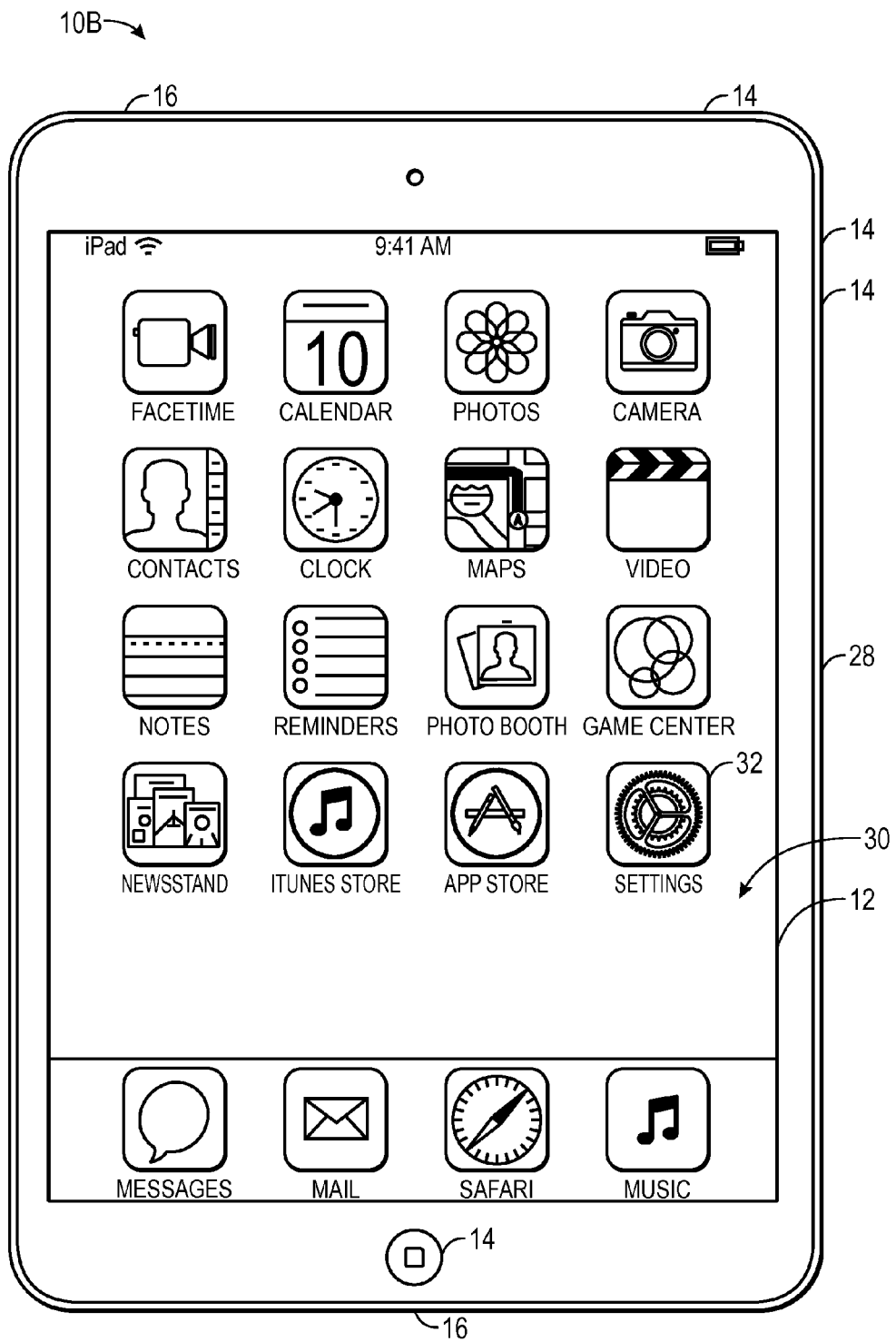
FIG. 3 is a front view of a tablet device, such as an iPad® by Apple Inc., representing an example of the electronic device of FIG. 1.
Figure 4:
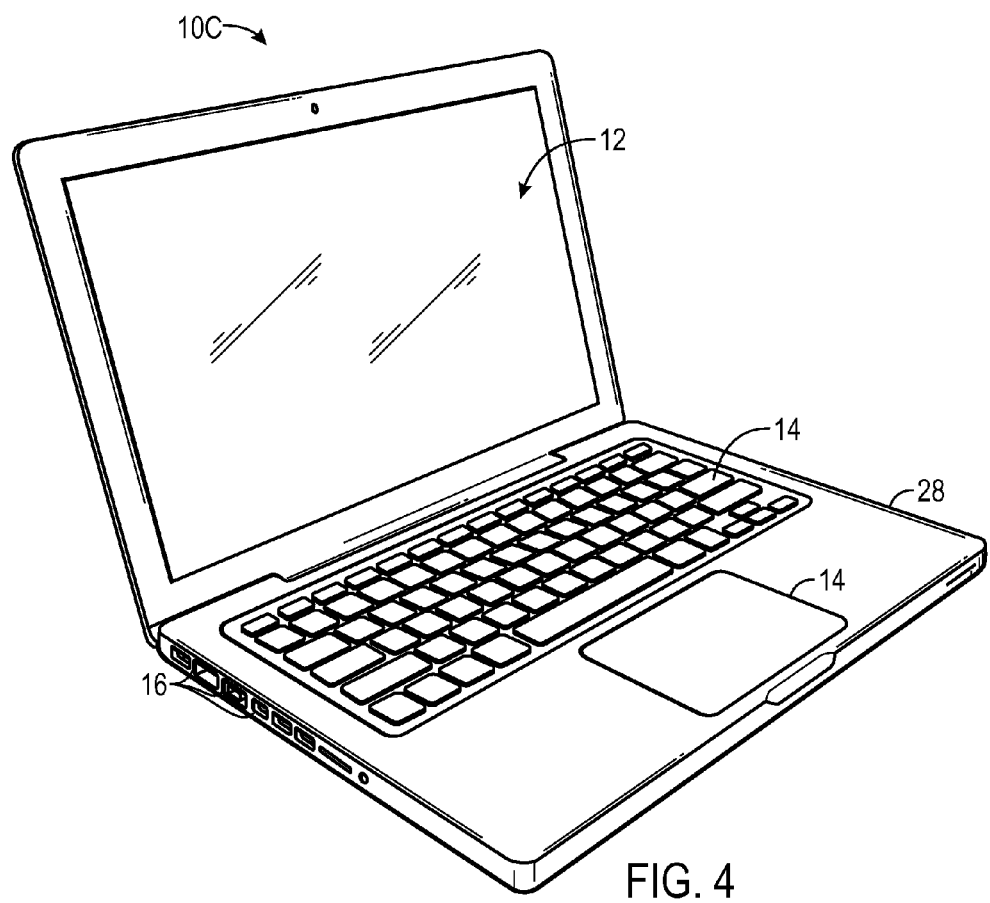
FIG. 4 is a perspective view of a notebook computer, such as a MacBook Pro® by Apple Inc., representing an example of the electronic device of FIG. 1.

A variety of suitable electronic devices may employ the techniques described herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as computer-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices 10.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Xcode, App Store, and Finder by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch an online application store program (e.g., App Store by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the presentation application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Xcode, Finder, or App Store by Apple Inc.) running on the computer 10C.

With the preceding in mind, a variety of computer program products, such as applications or operating systems, may use the techniques discussed below to enhance the user experience on the electronic device 10. Indeed, any suitable computer program product that includes a viewer for previewing files, an editor for manipulating files, and/or a development environment for building applications may employ some or all of the techniques discussed below.

Figure 5:
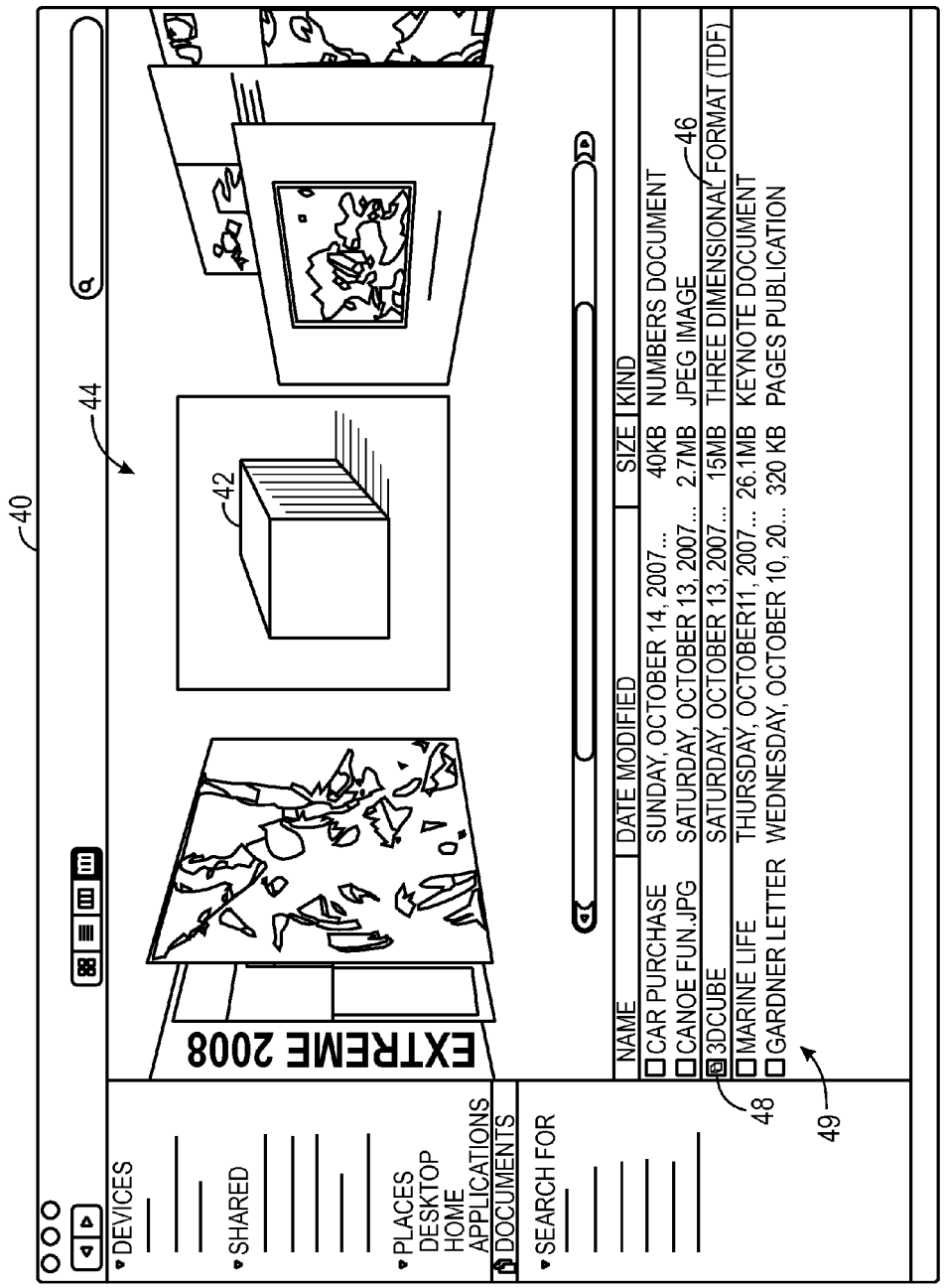
FIG. 5 illustrates a file management application previewing a three-dimensional (3D) asset, in accordance with an embodiment.

For example, a file management application 40 previewing a 3D asset 42 in a viewer 44 is illustrated in FIG. 5. In some embodiments, the file management application 40 may include Finder by Apple Inc. In the depicted embodiment, the 3D asset 42 has a developer created 3D file format 46 named "Three-Dimensional Format" (TDF), which may have a file extension of ".tdf." The computing device may be running an operating system, such as OS X® or iOS by Apple Inc. In order for the operating system to read, preview, and/or manipulate the file 48 named "3D Cube" it may install a plug-in configured to read 3D assets 42 having the TDF file format 46. The plug-in may be developed by a third party or it may be proprietary. In the depicted embodiment, the OS or the application has installed the plug-in configured to read TDF files because the viewer 44 is previewing the 3D asset 42. Indeed, the 3D asset 42 may be previewed like any other supported file format, such as joint photographic experts group (JPEG), portable document format (PDF), and the like, in a slideshow by the file management application 40. It should be appreciated that if the plug-in is installed in the OS, TDF files may be previewed and manipulated everywhere in the system. For example, other applications may benefit from the extensible framework by calling upon the installed plug-in to process TDF files, such as 3D-rendering frameworks (e.g., Scene Kit by Apple Inc.), quick preview programs (e.g., QuickLook and Preview by Apple Inc.), integrated development environments (e.g., Xcode by Apple Inc.), and so forth.

Further, the list 49 of files may include any number of 3D assets 42 having different kinds of 3D file formats. If the respective plug-in is installed by the OS and/or the application, the application may be enabled to preview and/or manipulate the 3D asset's file format. If the list 49 of files includes a 3D asset 42 having a 3D file format that is unrecognized by the OS, the application, and/or any installed plug-ins may obtain the proper plug-in to process files having that 3D file format via a network (e.g., the Internet). Thus, the disclosed framework allows new 3D file formats to be created and the system and/or applications to be able to read, preview, and/or manipulate 3D assets 42 having the new 3D file formats by obtaining and utilizing their respective plug-ins.

Figure 6:
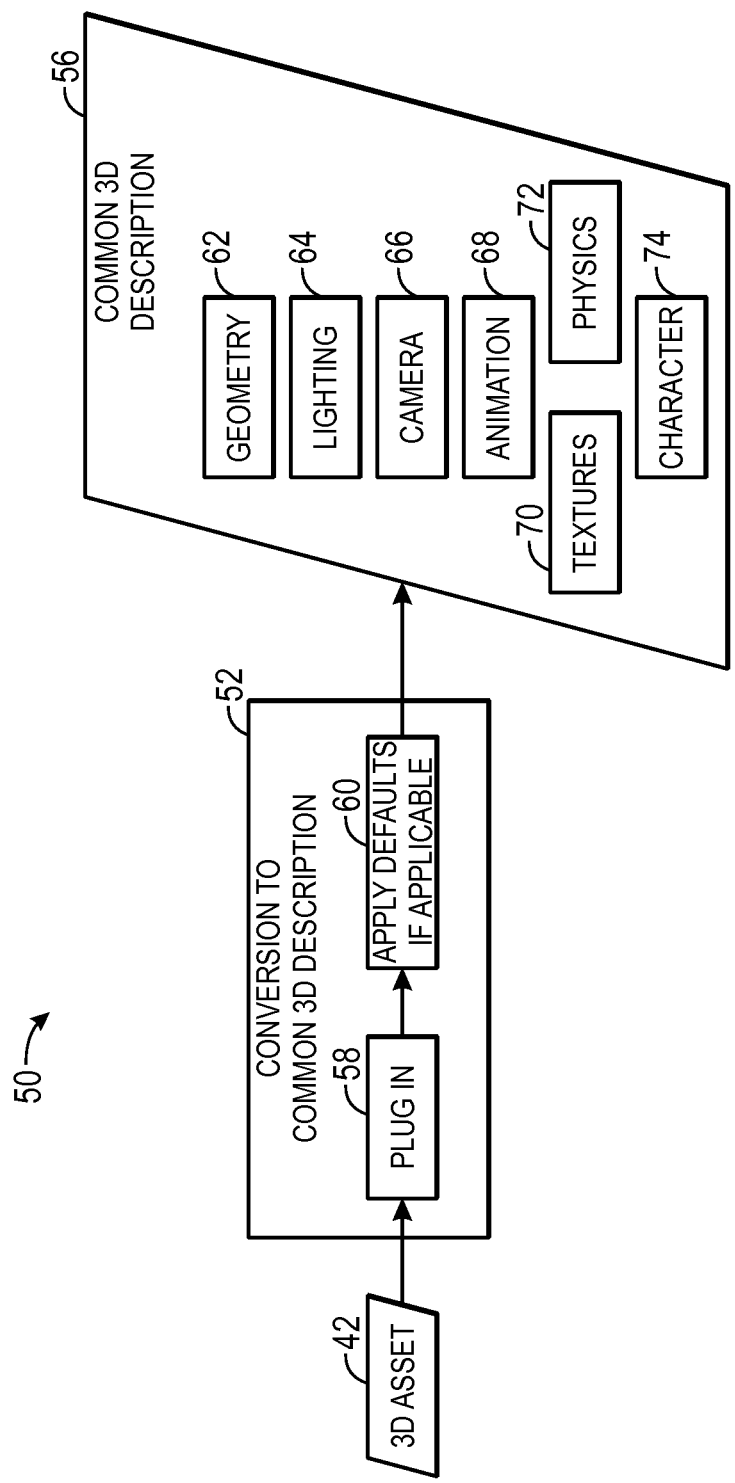
FIG. 6 is a block diagram of an extensible framework for converting a 3D asset to a common 3D description by utilizing a plug-in, in accordance with an embodiment.

To elaborate, FIG. 6 illustrates a block diagram of an extensible framework 50 for converting 52 a 3D asset 42 to a common 3D description 56 by utilizing a plug-in 58. It should be understood that the extensible framework 50 may enable converting 52 any number of 3D assets 42 having differing 3D file formats. The 3D file formats may be newly created by third parties or they may be proprietary and not recognized by any OS and/or application unless a respective plug-in 58 is installed. The respective plug-in 58 may also be created by a third party or it may be proprietary, and the plug-in 58 may be distributed via the Internet using an online application store (e.g., App Store by Apple, Inc.), download manager application, website, or the like. Plug-ins 58 may be software applications or components including computer instructions executable by any type of processor and stored on a tangible, non-transitory computer-readable medium. Any number of plug-ins 58 may be installed by an OS and/or application, each plug-in 58 to process a particular respective 3D file format.

In this way, as mentioned above, the techniques described enable a framework 50 that is extensible because developers can continue to create new 3D file formats and the OS and/or application can process the new 3D file formats by obtaining and installing the respective plug-in 58. To that end, the OS may include a plug-in architecture (e.g., NSExtensions by Apple, Inc.) that enables implementing proprietary and/or third party plug-ins 58. The plug-architecture may perform security validations and scans on the plug-ins 58 before installation in order to inhibit viruses, crashes, and the like.

Each plug-in 58 may process a specified 3D file format and produce a common 3D description 56 or representation for a target environment and/or application. In some embodiments, the target environment may be the operating system (e.g., iOS or OS X® by Apple Inc.) running on an embedded device or computer. Thus, the common 3D description 56 of the 3D asset 42 may include attributes or parameters of one or more 3D models recognizable by the target environment and/or application that is previewing and/or manipulating the 3D asset 42. In some embodiments, the common 3D description 56 may be a file having an application programming interface (API) format for an OS and/or particular application, or the common 3D description file may have a universal proprietary format understood by the OS and/or proprietary applications.

For example, a file management application 40 may be instructed to preview a 3D asset 42 by the user clicking on the file's name in a list 49 of files. The OS and/or the application may read the file extension and determine that it does not have a native component to read the 3D file format denoted by the file extension. However, the OS and/or the application may determine that an installed plug-in 58 is configured to process this type of 3D file format. Thus, the plug-in 58 may be passed a file path reference to the 3D asset 42 and the plug-in 58 may retrieve the file as input. Alternatively, the OS and/or the application may pass the 3D asset 42 directly to the identified plug-in 58. The plug-in 58 may begin conversion 52 of the 3D asset 42 to a common 3D description 56 by converting 52 the attributes provided for any 3D model(s) described in the 3D asset 42 into a format understood by the target environment and/or application. Once converted, the plug-in 58 may return the common 3D description 56 to the calling OS and/or the application.

Then, the OS and/or application may determine which attributes, if any, are missing from the common 3D description 56 and whether the missing attributes are basic attributes. Based on the determination, the OS and/or the application may apply defaults as applicable 60, which is discussed in detail below. In general, though, each plug-in 58 may generate a common 3D description 56 with attributes including information for geometry 62, lighting 64, camera 66, animations 68, textures 70, physics 72, and characters 74, among others.

After any default values are applied, if needed, the OS and/or the application may utilize the common 3D description 56 to present the 3D model(s) described to a user as a preview in a viewer 44 and/or enable a user to manipulate the 3D model(s) described and save any changes to the 3D asset 42. Enabling developers to create their own 3D file formats that can be recognized and processed by any OS and/or application, such as an IDE, running a respective plug-in configured to process 3D assets 42 having the created 3D file format may further enable the developers to create more streamlined and efficient applications utilizing 3D assets 42 with file formats specifically tailored for particular purposes.

Figure 7:
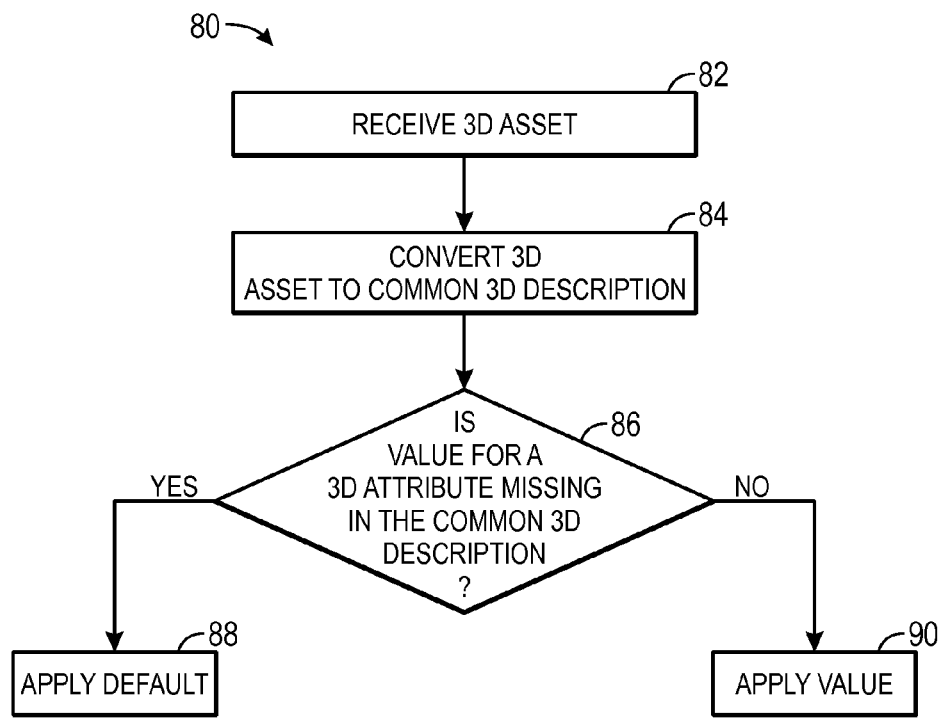
FIG. 7 is a flowchart illustrating an embodiment of a process suitable for applying defaults to the common 3D description as applicable, in accordance with an embodiment.

As mentioned above, some 3D assets 42 may not provide values for all of the attributes that may be included in a full common 3D description readable by a target environment and/or application. In such a scenario, if the attributes that are missing are not basic attributes, defaults may be applied by the OS and/or application after the plug-in 58 returns the common 3D description 56. To help illustrate, FIG. 7 is a flowchart depicting an embodiment of a process 80 suitable for applying defaults to the common 3D description 56 as applicable. The process 80 may include a plug-in 58 receiving a 3D asset 42 (process block 82), converting the 3D asset 42 to a common 3D description 56 (process block 84), the OS and/or application determining whether the value for a 3D attribute is missing in the common 3D description 56 (decision block 86), and applying a default value if so (process block 88) or applying the provided value if not (process block 90).

More specifically, the process 80 may begin by the plug-in 58 receiving a file path reference to the 3D asset 42 having a 3D file format associated with and recognizable by the plug-in 58 (process block 82). The plug-in 58 may then locate and retrieve the 3D asset 42 for conversion to a common 3D description 56 (process block 84). In some embodiments, the 3D asset 42 may be passed directly to the plug-in 58 for conversion. Converting 52 the 3D asset 42 to a common 3D description 56 may include the plug-in 58 knowing the target environment and/or application to which the common 3D description 56 will be returned. This knowledge may enable the plug-in 58 to format the data properly in order to be read, previewed, and/or manipulated by the target environment and/or application. Additionally, the plug-in 58 may perform one or more enhancements to the common 3D description 56 based on the target environment and/or application.

Once the plug-in 58 converts the 3D asset 42 to a common 3D description 56, the plug-in 58 may return the common 3D description 56 to the calling OS and/or application. The OS and/or application may analyze the common 3D description 56 and determine whether any 3D attribute values are missing (decision block 86). If the OS and/or application determine that the value for a 3D attribute is missing from the common 3D description 56 and the 3D attribute is not a basic attribute, then a default may be applied (process block 88). On the other hand, if the values for the 3D attributes are not missing in the common 3D description 56, then the OS and/or application may utilize the provided attribute values.

For example, several attributes that may be basic in a common 3D description 56 may include geometry information 62 (e.g., faces, vertices, triangles), among others. If the common 3D description 56 does not provide values or data for a basic attribute, the OS and/or application may have trouble reading, previewing, and/or manipulating the common 3D description 56 because these attributes may be fundamental to the 3D model's basic shape, orientation, and the like. Thus, in some embodiments, if the common 3D description 56 is missing basic attribute information, the OS and/or application may not preview and/or manipulate the file. Also, the OS and/or application may notify the user that the selected 3D asset 42 has an incompatible 3D file format.

In contrast, several attributes that may be non-basic may include normals, animation descriptions 68, lighting 64, camera positions and angles 66, characters 74, and physical properties 72, among others. For these types of attributes, if the plug-in 58 returns a common 3D description 56 with empty values, the OS and/or application may apply default values for the attributes and the common 3D description 56 may be read, previewed, and/or manipulated.

The OS and/or application may utilize a number of methods for applying default values when applicable. For example, if the common 3D description 56 is lacking values for the camera attributes 66, such as position and angle of the camera, the OS and/or application may choose an arbitrary point of view to place the camera. To achieve this, the OS and/or application may compute boundary boxes around the 3D model(s) to form a boundary balloon and place the camera somewhere outside the boundary balloon, for example, at 45° on the X and the Y axes. Further, if the lighting attribute 64 is absent from the common 3D description 56, the OS and/or application may apply default values that add one or more light sources at an arbitrary angle, such as 45° on the X and Y axes, or the light source may be positioned where the camera is positioned. Further, default values for the light source's intensity, color, density, and so forth, may be applied to the common 3D description 56.

Also, the OS and/or the application may add normals if they are not included in the common 3D description 56 generated by the plug-in 58. As may be appreciated, a normal to a surface at a point may refer to a vector that is perpendicular to a tangent plane to the surface at that point. If the normals are absent from the common 3D description 56, the OS and/or the application may add default values by calculating the normals based on the types of shapes included in the 3D model(s). In addition, default values for the physical properties attribute 72, which may include the mass of objects, elasticity, bounds, and so forth, may also be added by the OS and/or the application.

Figure 8:
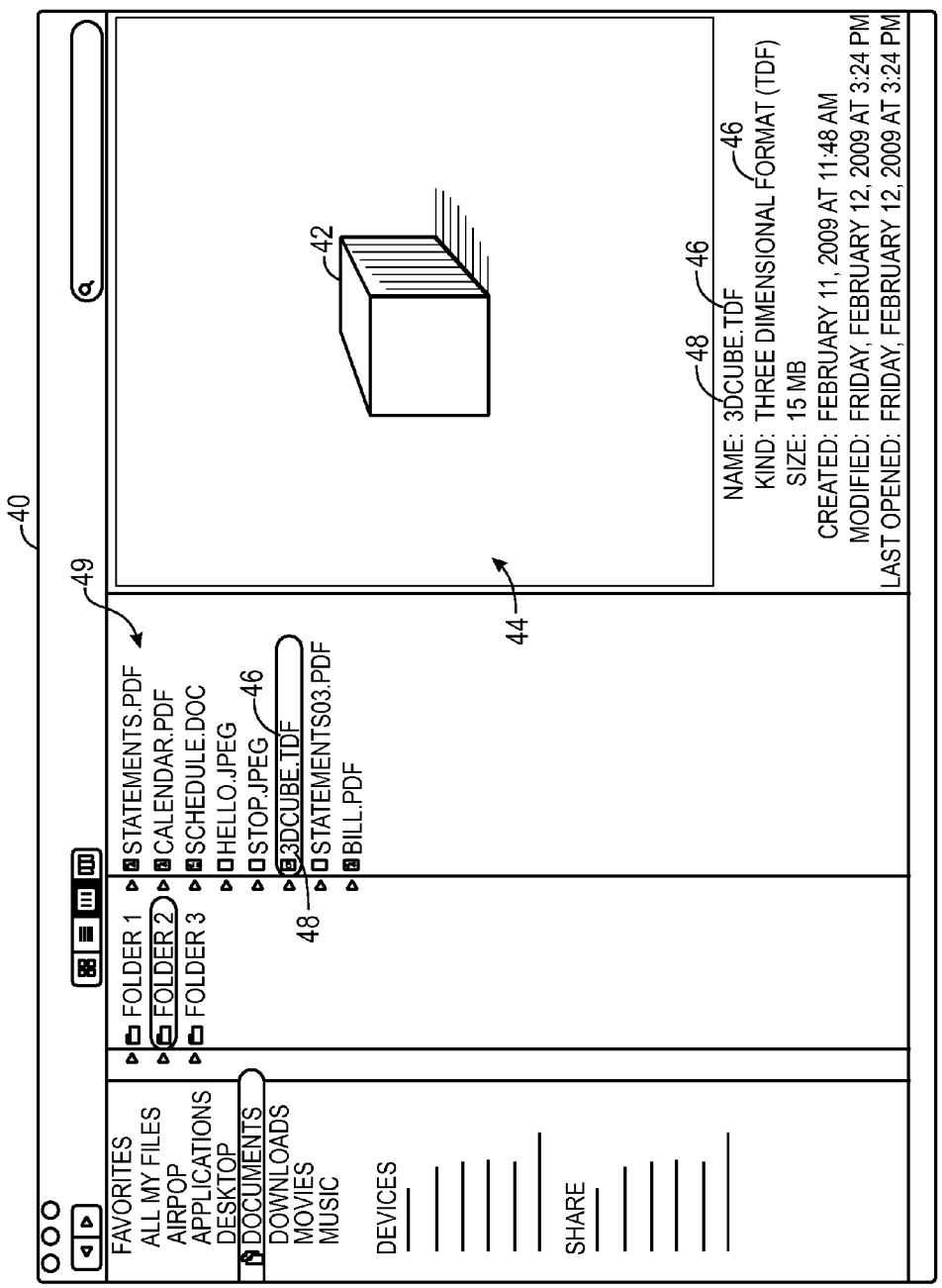
FIG. 8 illustrates an a file management application previewing a 3D asset in a side viewing pane, in accordance with an embodiment.

As a result, after applying any applicable defaults, the common 3D description 56 may more accurately reflect any 3D models described by the original 3D asset 42. The complete common 3D description 56 may be read, previewed, and/or manipulated by an application. For example, as illustrated in FIG. 8, a common 3D description 56 of a 3D cube asset 42 having the third party created 3D file format 46 "Three-Dimensional Format" (TDF) is previewed in a viewer 44 of a file management application 40 (e.g., Finder by Apple Inc.). This embodiment shows an alternative view to the view illustrated in FIG. 5 for previewing 3D assets 42 with non-proprietary file formats by utilizing plug-ins 58, as described above. As depicted, the viewer 44 pane is to the side of the file list 49 and only the selected 3D asset 42 is being previewed. With the foregoing description in mind, it may be better understood that the file list 49 may include 3D assets 42 having any number of different 3D file formats, and as long as the OS and/or application has installed the respective plug-in 58 for the 3D file format, the 3D asset 42 may be previewed and/or manipulated by the application 40.

Figure 9:
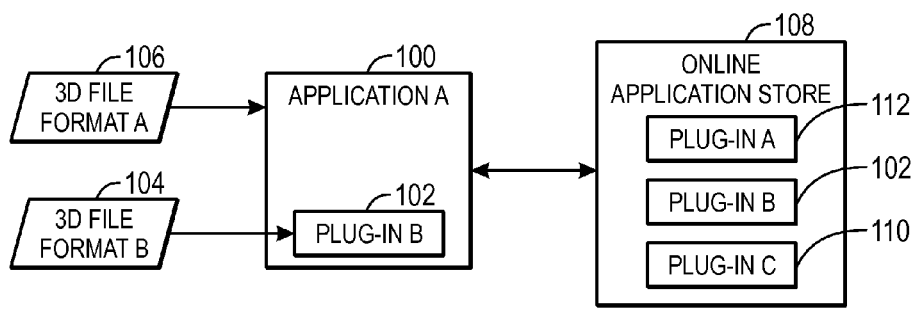
FIG. 9 is a block diagram of a first application utilizing a plug-in to read a 3D asset having a second 3D file format and the first application interfacing with an online store where additional plug-ins may be downloaded, in accordance with an embodiment.

In certain embodiments, a first application may include one or more plug-ins 58 installed so that the application is capable of reading, previewing, and/or manipulating the 3D file formats associated with the plug-ins 58. To help illustrate, FIG. 9 is a block diagram of an application A 100 that includes plug-in B 102 configured to read 3D assets 42 having a second file format B 104. The application A 100 may include native components configured to read 3D assets 42 having a first file format A 106. However, as shown, the application A 100 has plug-in B 102 installed, which application A 100 may have downloaded from an online application store 108, such as the App Store by Apple Inc. In some embodiments, the plug-in B 102 may be separate from application A 100 and installed by the OS on which application A 100 is running. In such an embodiment, application A 100 may invoke the plug-in B's functionality from the OS. In any embodiment, when a user requests to preview a file having 3D file format B 104, the application A 100 may call the plug-in B 102 that may convert files having 3D file format B 104 to a common 3D description 56 by passing the plug-in B 102 a file path reference to the selected 3D asset 42 or sending the 3D asset 42 having 3D file format B 104 directly to plug-in B 102.

As may be appreciated, if there is a 3D asset 42 having a file format C and a user requests application A 100 to preview the file, the application A 100 and/or OS may download the plug-in C 110 from the online application store 108, install the plug-in C 110, and the plug-in C 110 may provide a common 3D description 56 for a file having a 3D file format C to the application A 100 and/or OS for previewing and/or manipulation. Likewise, if there is a second application, application B, for example, it may download plug-in A 112 if a user requests application B to process 3D assets 42 having 3D file format A 106. Indeed, utilizing the extensible framework 50 described herein, an OS and/or an application may read, preview, and manipulate any type of 3D file format if the respective plug-in 58 is installed.

Figure 10:
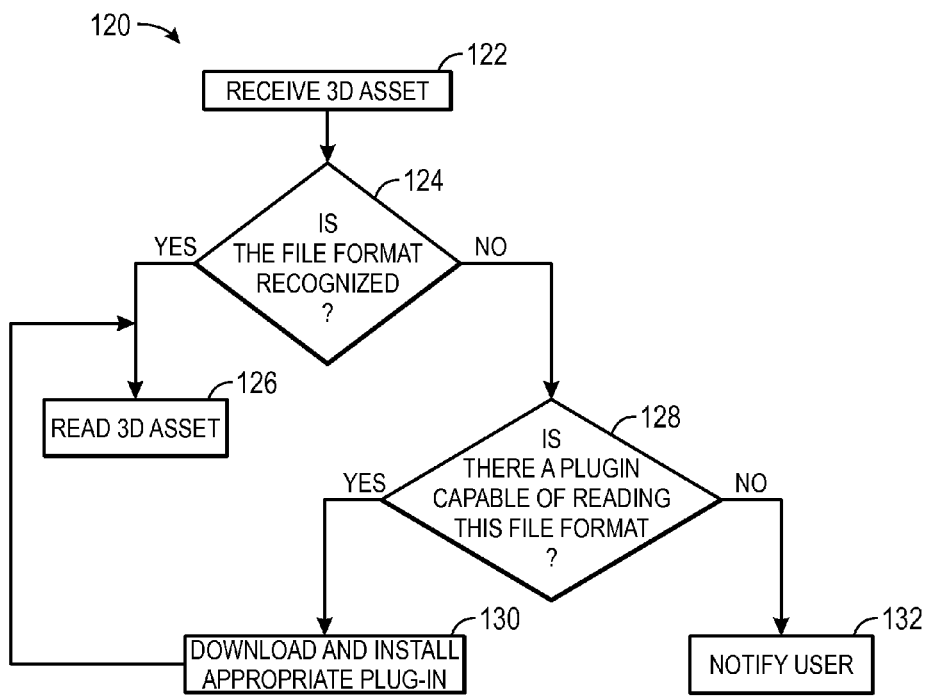
FIG. 10 is a flowchart illustrating an embodiment of a process suitable for downloading and installing appropriate plug-ins for unrecognized 3D file formats, in accordance with an embodiment.

A process 120 suitable for downloading and installing appropriate plug-ins 58 for unrecognized 3D file formats is illustrated in FIG. 10. The process 120 may include an application receiving a 3D asset 42 (process block 122), determining whether the application recognizes the 3D file format (decision block 124) and reading the 3D asset 42 (process block 126) if so or, if not, determining whether there is a plug-in 58 capable of reading the 3D asset's file format that is available (decision block 128). If there is a plug-in 58 configured to read the provided 3D asset's file format, then the application may download and install the appropriate plug-in 58 (process block 130) and read the 3D asset (process block 126), or if there is not a plug-in 58 configured to read the provided 3D asset's file format, then the application may notify the user (process block 132).

In some embodiments, after the application receives the 3D asset 42 (process block 122), it may determine whether the 3D file format is recognized by checking whether its native components can read the 3D asset's file format or any installed plug-ins 58 can read the 3D asset's file format. If one of the application's native components and/or installed plug-ins 58 may read the 3D file format, the application may read the 3D asset 42 (process block 126), preview the file, and/or manipulate the file as desired. However, if the application's native components and installed plug-ins 58 are not configured to process 3D assets 42 having the specified 3D file format, then the application may contact and search an online application store 108 (e.g, App Store by Apple Inc.), the Internet, or the like, for a plug-in 58 that may read the 3D asset's file format.

If the online application store 108 or the Internet returns a plug-in 58 configured to read the particular 3D asset's file format, the application may download and install the plug-in 58. Then, the application may proceed to read the 3D asset 42 (process block 126) by utilizing the newly installed plug-in 58 to convert the 3D asset 42 to a common 3D description 56, as described above. If there is no plug-in 58 found, then the application may notify the user that the 3D asset's file format is unsupported by the application and/or the OS and that no supporting plug-in 58 was found. This may prompt the user to leverage the extensible framework 50 provided herein to develop a plug-in 58 that is enabled to process the particular 3D asset's file format.

Figure 11:
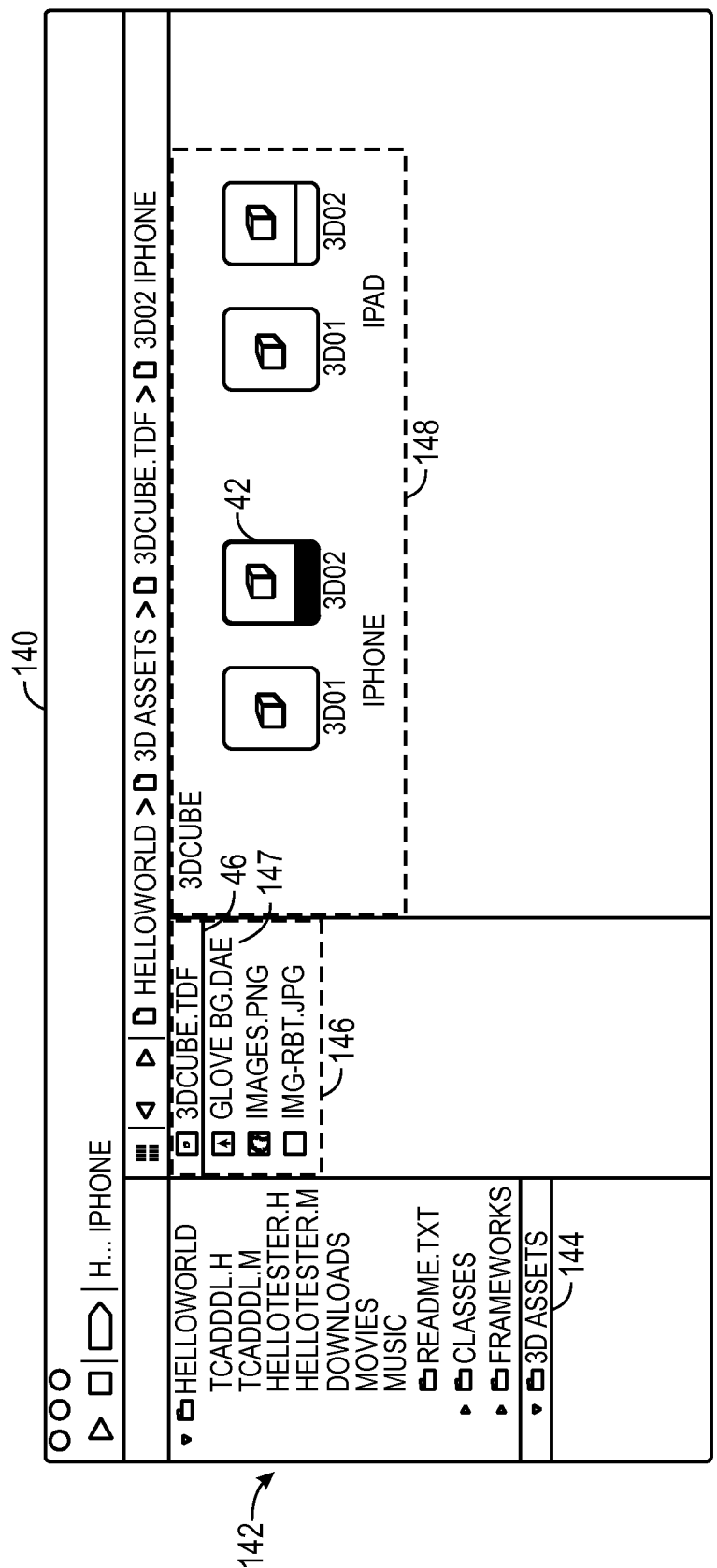
FIG. 11 illustrates a developer console where a developer may select a 3D asset from a list of multiple 3D assets having different 3D file formats and preview and/or manipulate the 3D asset in a viewer, in accordance with an embodiment.

In FIG. 11, a developer console, such as an integrated development environment (IDE) 140 (e.g., Xcode by Apple Inc.), is illustrated that utilizes multiple 3D assets 42 having different 3D file formats. The IDE 140 may enable a developer to write applications for different operating systems (e.g., iOS or OS X® by Apple Inc.). The IDE 140 may include a source code editor, a debugger, a compiler, build automation tools, and so forth. Also, the IDE 140 may include a file manager 142 portion where a particular project may be managed. For example, various source code files, image files, and 3D assets 42 may be organized in folders in the file manager 142. A developer may select the 3D asset folder 144 from the file manager 142 and a 3D asset list 146 may display all of the 3D assets 42 contained in the 3D asset folder 144. Each 3D asset 42 may have differing 3D file formats. Some of the 3D assets may have commonly known file formats, such as the .DAE file format 147, or developer created file formats. The recognized file formats may be processed by the IDE's native components. On the other hand, if the 3D assets' file formats were created by a third party (e.g., the developer), the IDE 140 may not include native components that are configured to read the 3D assets' file formats.

However, utilizing the techniques described herein, plug-ins 58 that are configured to read the developer created 3D file formats may be created and installed so that the IDE 140 may process (e.g., read, preview, manipulate, enhance) the 3D assets 42. As illustrated, the IDE 140 is previewing the 3D asset 42 named "3D Cube" having the "Three-Dimensional Format" (TDF) file format 46 in a viewer 148. The developer can select as many 3D assets 42 as desired to build a movie, a game, application, or the like, and it does not matter what the 3D assets' file format is because, as long as the respective plug-ins 58 are installed, the plug-ins 58 will generate an API file format (e.g., common 3D description 56) understood by the IDE 140. Thus, the plug-ins 58 may represent an abstraction layer in that they may function as subprograms of the parent application and/or OS after installation because each plug-in 58 may perform the separated function of converting a specific 3D asset's file format to a universal file format. Further, as described in detail below, when the developer builds the movie, game, application, or the like, the 3D assets 42 may be enhanced in order to provide better performance at runtime.

Figure 12:
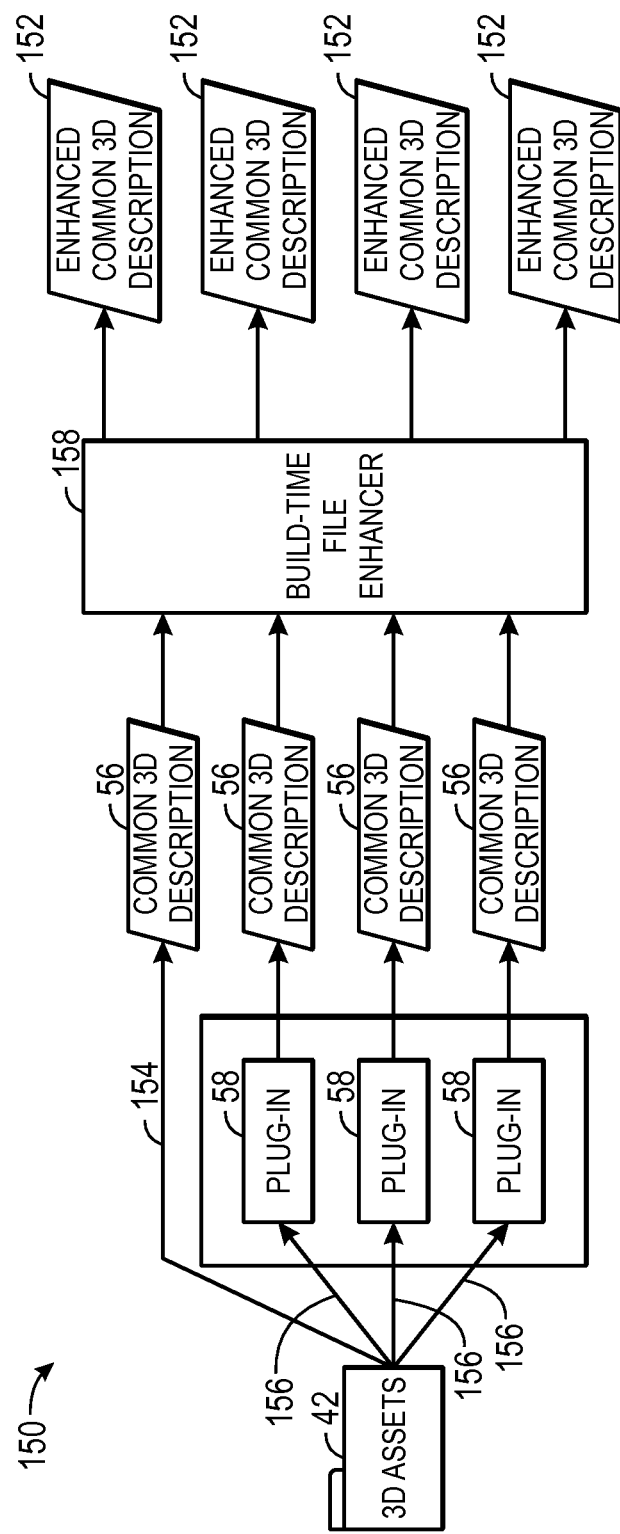
FIG. 12 is a block diagram of a system where multiple 3D assets may be converted to common 3D descriptions and enhanced to enhanced common 3D descriptions, in accordance with an embodiment.

To help illustrate how the functionality described above is enabled, FIG. 12 depicts a system 150 where multiple 3D assets 42 are converted to common 3D descriptions 56 and enhanced to enhanced common 3D descriptions 152. In some embodiments, 3D assets 42 may be accessed in a particular folder by an OS and/or an application, such as the IDE 140 described above. For example, when an IDE 140 builds an application, the IDE 140 may search the particular folder for 3D assets 42 to enhance Once 3D assets 42 are selected by a user or developer to be utilized in an application, the OS and/or application may determine whether its native components recognize the 3D assets' file formats or whether any plug-ins 58 installed by the OS and/or the application recognize the 3D assets' file formats. In the depicted embodiment, the OS and/or application's native components recognize one of the 3D assets' file formats (line 154) and convert it to a common 3D description 56. Also, the OS and/or application's plug-ins 58 are each configured to read and convert separate 3D asset 42 file formats, and each plug-in 58 may receive a 3D asset 42 having the respective 3D file format (lines 156). Receiving the 3D asset 42 may include receiving a file path reference to the 3D asset 42 and the plug-in 58 retrieving the 3D asset 42. Alternatively, receiving the 3D asset 42 may include receiving the 3D asset 42 file passed by the OS and/or the application.

Next, the plug-ins 58 may convert the 3D assets 42 to common 3D descriptions 56 for the target environment and/or application. As previously discussed, this may include providing attributes for information related to geometry 62, lighting 64, camera 66, animation 68, textures 70, physical properties 72, character 74, and so forth. Once converted to the common 3D descriptions 56, the plug-ins 58 may return the common 3D description 56 to the OS and/or application, which may apply defaults if applicable. The fully converted common 3D descriptions 56 may be utilized by the OS and/or application to preview the 3D model(s) described and/or manipulate the 3D model(s) described.

Additionally, the common 3D descriptions 56 may be selected to be included in an application by a developer using an IDE 140 (e.g., Xcode by Apple Inc.). For example, a developer may be developing a video game application that utilizes 3D animated character models. As mentioned above, the 3D assets 42 may reside in a particular folder that the IDE 140 searches when an application is built. If the IDE 140 and/or the OS determine that any of the 3D assets 42 have non-natively recognized 3D file formats, the IDE 140 and/or the OS may determine whether any installed plug-ins 58 recognize the 3D file formats. If installed plug-ins 58 are found, the IDE 140 may pass the 3D assets 42 having the non-natively recognized 3D file formats to their respective plug-ins 58. The plug-ins 58 may convert the 3D assets 42 having the respective 3D file format to common 3D descriptions 56 and return the common 3D description 56 to the IDE 140. Further, any 3D assets 42 having natively recognized 3D file formats may be converted to common 3D descriptions 56 by the native components. Next, the common 3D descriptions 56 may be passed to a build-time file enhancer 158 that performs numerous enhancements to the common 3D descriptions 56 at build-time. The build-time file enhancer 158 may output enhanced common 3D descriptions 152 that are added to a built application bundle. The build-time file enhancer 158 may include computer instructions executable by one or more processor and stored on one or more tangible, non-transitory computer-readable medium. The enhanced common 3D descriptions 152 may perform better at runtime, which may increase the performance and efficiency of their calling application. In some embodiments, the plug-ins 58 may perform the build-time enhancements prior to returning the common 3D descriptions 56 to the OS and/or the application.

Figure 13:
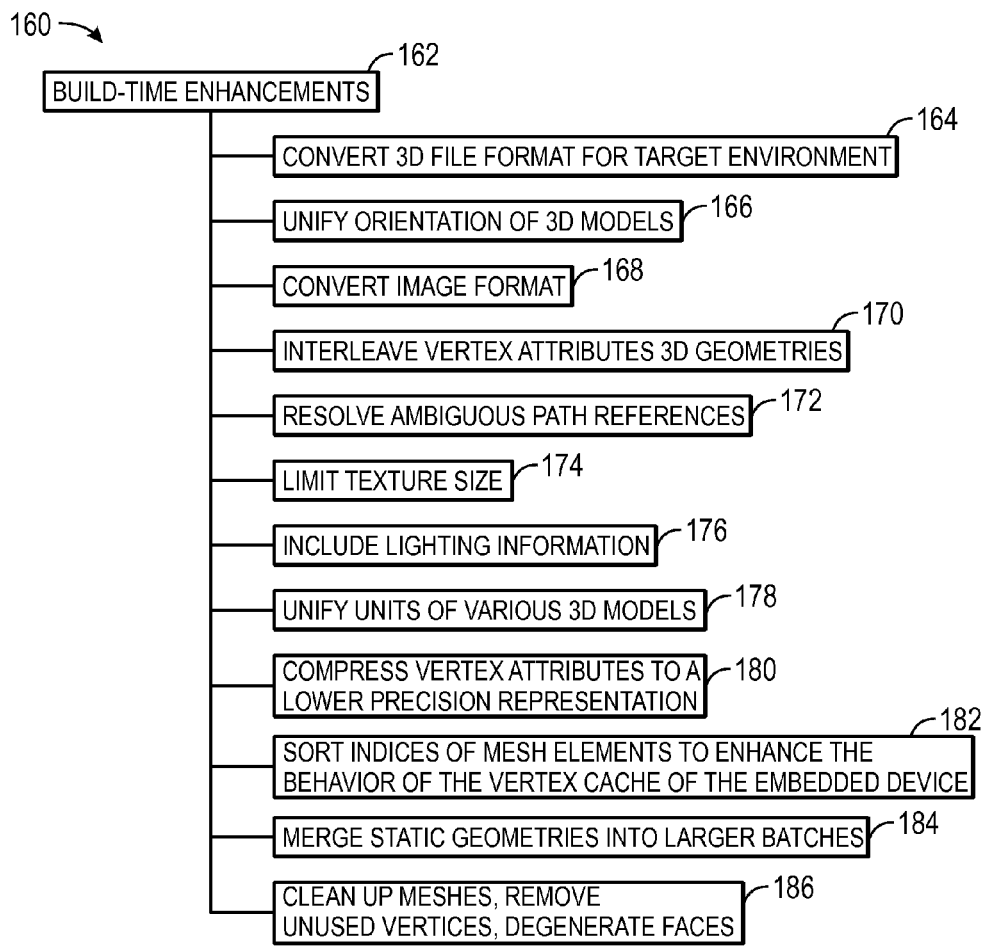
FIG. 13 is a schematic diagram of build-time enhancements performed on the 3D assets, in accordance with an embodiment.

Various build-time enhancements 162 that may be performed by the build-time enhancer 158 and/or the plug-ins 58 are depicted in the schematic diagram 160 shown in FIG. 13. The build-time enhancements 162 may occur during the build process of an application. As should be appreciated, the order in which the various build-time enhancements 162 are performed may vary depending on the type of 3D asset 42, the target environment of the application, and/or the type of application, among other things. Further, not all of the enhancements may be performed every time an application is built. That is, some of the enhancements may be optional. In certain embodiments, 3D assets 42 that are placed in a particular folder (e.g., ".scnassets") will automatically have one or more of the below enhancements performed to them. It should be noted that these enhancements 162 may be performed by the application on a plurality of 3D assets 42 at build-time or on common 3D description 56 files returned by plug-ins 58 for 3D file formats not natively recognized by the application. Additionally, these enhancements 162 may be performed by the plug-ins 58 before returning the common 3D descriptions 56.

One enhancement 164 of the build-time enhancements 162 may be to convert the 3D file format for the target environment. This may include converting the 3D asset's file format to a proprietary format enhanced for a particular OS (e.g., iOS or OS X® by Apple Inc.). The converted format may be further compressed into binary, which may be quick to load when called because binary may be read faster at runtime by one or more processors than other data formats, such as XML. The compression may be achieved by utilizing an archive file format that supports lossless data compression, such as the zip file format.

A second enhancement 166 of the build-time enhancements 162 may be to unify the orientation of the various 3D model(s) included in the 3D assets 42. If there are multiple 3D assets 42 selected, and different tools were used to create the 3D assets 42, the orientation of axes of the 3D model(s) may be different. For example, different tools may define up, down, left, and right differently. That is, one tool may utilize the X axis for a particular orientation and another tool may utilize the Z axis for the same orientation. Thus, the present enhancement 166 alleviates this issue by reading each file, determining if the file's orientation for axes is different than the default orientation used by the OS and/or the application, and converting the orientation of the file if so. Unifying the orientation of the 3D model(s) at build-time will enhance performance by preventing the processor from figuring out the orientations during runtime.

A third enhancement 168 of the build-time enhancements 162 may be to convert image format. Depending on the target environment, some image formats may be desirable over others. For example, if the target environment is a light OS, such as iOS by Apple Inc., the format for all images utilized by the application may be converted to a compressed texture format enhanced for embedded devices (e.g., PVRTC). The compressed images may load faster because they may embed mip maps, which may save the processor from re-computing the images at load time. Additionally, the compressed images may load faster because they match the representation of textures in the embedded device, which may save processing time for any decompression that would have to be done for portable network graphics (PNG) or JPG. However, if there is not a PVRTC equivalent available for the target environment, other image formats may be utilized, such as the PNG format that supports lossless data compression. Also, for computers that utilize full-scale operating systems (e.g., OS X®), a proprietary or third party text format enhanced for the particular environment may be utilized.

A fourth enhancement 170 of the build-time enhancements 162 may be to interleave vertex attributes of 3D geometries. The vertex attributes may include position, color, normals, texture coordinates, and so forth. The interleaved vertex attributes of each 3D geometry (e.g., triangle) may be stored in separate buffers. The processor may save processing time by accessing interleaved vertex attributes for each 3D geometry during runtime in the respective buffers. Further, the 3D geometry information may be stored in a serial data structure to further enhance performance during runtime.

A fifth enhancement 172 of the build-time enhancements 162 may be to resolve ambiguous file path references. The 3D assets 42 utilized in the application may refer to other 3D assets 42 by storing references to the other 3D assets' file paths. However, the file path references may be ambiguous if, for example, the assets were ported over from a different operating environment with a different file structure. For example, an absolute path reference to a 3D asset 42 in one operating environment may not exist in a different operating environment. Therefore, the present techniques solve this issue by checking every path reference and correcting any ambiguities by saving a new path reference relative to the root folder of the application. As described in detail below, resolving the ambiguous file path reference may include finding the file's base folder by utilizing its name and searching the file's parent folders until the ambiguity is resolved. Resolving the ambiguous path references at build-time may enable the 3D asset 42 and its associated references to load faster on an embedded device or computer during runtime. Indeed, pre-computing the relative path at build-time avoids the performance hit of searching for a referenced asset within the application bundle during runtime.

A sixth enhancement 174 of the build-time enhancements 162 may be to limit the texture size. By limiting the size of textures to a maximum arrangement of pixels (e.g., 512×512), the application can ensure the amount of memory that each image may utilize. This, in turn, may enhance the performance of the application because the images may load faster if they limit memory usage.

A seventh enhancement 176 of the build-time enhancements 162 may be to include the lighting information. In some scenarios, the shadow information or lighting information may not be included as attributes in a 3D asset 42. Instead, the shadow and lighting information may be added at runtime. However, computing where to apply shadows and/or light, how dense to make the shadow, how intense to make the light, and so forth, may slow down the application. Thus, determining whether the common 3D description 56 is missing the shadow and lighting information at build-time and adding that information if so may enhance the application's performance at runtime.

An eighth enhancement 178 of the build-time enhancements 162 may be to unify units of various 3D models described in the 3D asset 42. For example, different 3D models may utilize different units of measurement in their representations of objects. One 3D model may define a 50-pixel area as a foot in its 3D space, whereas another 3D model may define a 200-pixel area as a foot in its 3D space. Thus, this enhancement 178 may calculate a uniform unit to apply to the various 3D models to save the processor from having to perform this calculation at load time.

A ninth enhancement 180 of the build-time enhancements 162 may be to compress vertex attributes to a lower precision representation. Compressing the vertex attributes to a lower precision representation may enable the processor to load the vectors in a 3D space faster at load time because loading a representation at a lower precision is not as computationally intensive as loading the representation at a higher precision.

A tenth enhancement 182 of the build-time enhancements 162 may be to sort indices of mesh elements to enhance the behavior of a vertex cache of an embedded device. The vertex cache may store vertices that are recently rendered to avoid re-processing. In an embodiment, this enhancement 182 sorts the indices of the mesh elements stored in the vertex cache to efficiently access the recently-rendered vertices for mesh elements. Sorting the indices of mesh elements at build time may reduce work done by the processor at load time when rendering a 3D representation.

An eleventh enhancement 184 of the build-time enhancements 162 may be to merge static 3D geometries into larger batches. In some instances, separate buffers are utilized for static 3D geometry information including vertices, normals, and texture coordinates. As a result, retrieving static 3D geometry information to represent the 3D model may be slowed because of the multiple buffers involved. Thus, this enhancement 184 may alleviate this issue by utilizing a single buffer that describes and interleaves the static attributes that are updated less frequently in a larger batch.

A twelfth enhancement 186 of the build-time enhancements 162 may be to clean up meshes by removing unused vertices, degenerating faces, and the like. Cleaning up meshes by removing unused vertices and degenerating faces may save processing time at load time because the processor may avoid spending time and resources on processing and rendering vertices that are not utilized.

It should be noted that the build-time enhancements 162 described above are examples and not meant to be an exhaustive list. Indeed, other enhancements may be performed to the 3D assets 42 or common 3D descriptions 56 at build-time. As mentioned above, any combination of the build-time enhancements 162 may be performed as desired and the build-time enhancements 162 may be performed in any order.

Figure 14:
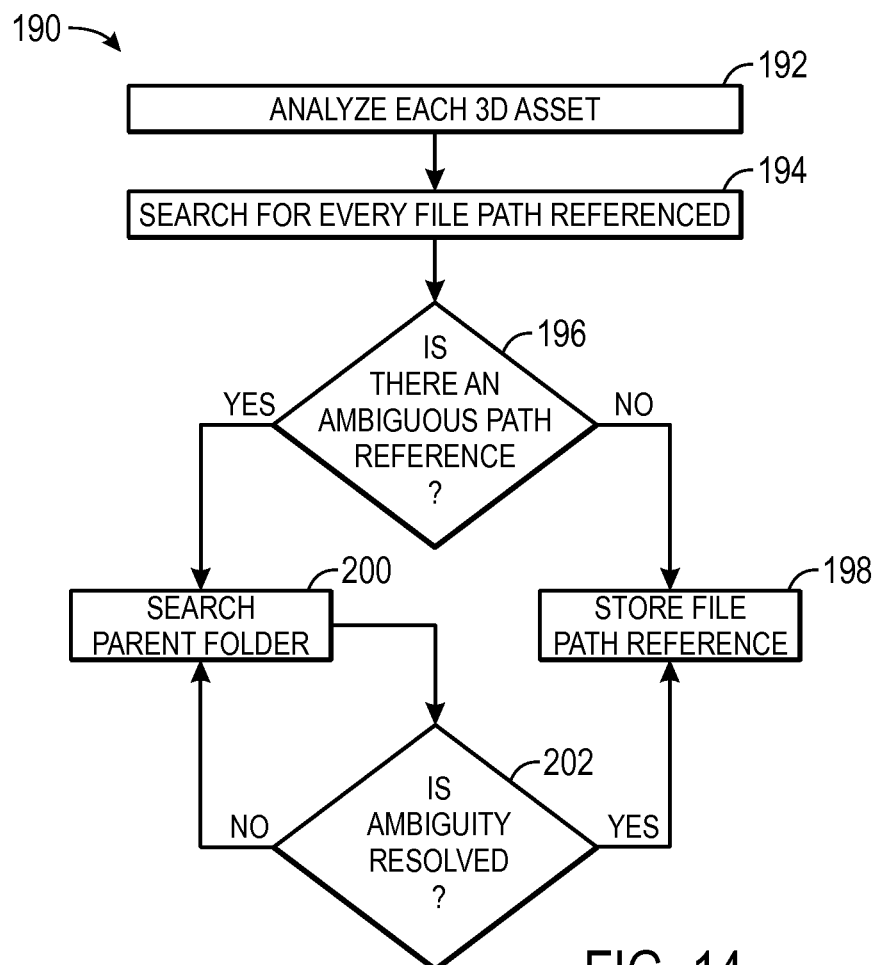
FIG. 14 is a flowchart illustrating an embodiment of a process suitable for resolving ambiguous file path references included in a 3D asset, in accordance with an embodiment.

FIG. 14 is a flowchart illustrating an embodiment of a process 190 suitable for resolving ambiguous file path references. The process 190 may include an application, such as a build-time file enhancer 158 and/or a plug-in 58, analyzing each 3D asset 42 that is utilized in the application (process block 192), searching for every file path referenced by each 3D asset 42 (process block 194), and determining whether there is an ambiguous path reference (decision block 196). If there is not an ambiguous file path reference, then the application and/or the plug-in 58 may store the original file path reference (process block 198). If there is an ambiguous file path reference, the application and/or the plug-in 58 may search for the correct file by its file name. The process 190 may be implemented as computer instructions executable by one or more processors and stored on one or more tangible, non-transitory computer-readable medium.

Ambiguous file path references may occur when absolute paths or relative paths are used. In the case of absolute path references, if the 3D asset 42 was created in a first operating environment with a first file structure and then is ported to a second operating environment with a second file structure, the directories, folders, and so forth may not match between the two file structures. Thus, any absolute references to the directories or folders from the first operating environment may be incorrect when referenced in the second operating environment. In the case of relative path references, the root folder or intermediary folders included in the path may have changed or been deleted.

In any case, once the correct file is found, the application and/or plug-in 58 may search the 3D asset's parent folder (process block 200) to determine whether the ambiguity is resolved (decision block 202). If the ambiguity is resolved, the application and/or the plug-in 58 may store the correct file path reference so that the application and/or plug-in 58 can avoid searching for the referenced asset during runtime. If the ambiguity is not resolved, however, the application and/or the plug-in 58 may search the parent folder of the first parent folder (process block 200). This process may continue to loop until the ambiguity is resolved and the proper file path reference is stored. However, the loop may terminate if the root folder is encountered and the ambiguity is still not resolved. In such a scenario, the process 190 may determine to eliminate the file path reference from the 3D asset 42.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory, computer-readable medium having instructions stored thereon, wherein the instructions are configured to cause a processor to:

process a file having a first three-dimensional (3D) file format utilizing a first plug-in and process a second file having a second 3D file format utilizing a second plug-in, wherein the first and second plug-ins are configured to be downloaded and installed, to receive a plurality of input files describing one or more 3D models and having either the first or the second file format respectively, to read either the first or the second file format, and to generate a common 3D description to be previewed by an application or an operating system, wherein, for each of the plurality of input files, the first and second plug-ins return the common 3D description that describes 3D model information.

2. The computer-readable medium of claim 1, wherein the 3D model information described by the common 3D description comprises geometric information, animation information, lighting information, camera position information, texture information, physic properties information, or any combination thereof.

3. The computer-readable medium of claim 1, wherein the instructions are configured to cause the application or the operating system to provide defaults for missing information from the common 3D description.

4. The computer-readable medium of claim 3, wherein a default for camera position information is determined by calculating boundary boxes around a 3D model to form a boundary balloon and picking an arbitrary point to position the camera on axes outside of the boundary balloon.

5. The computer-readable medium of claim 1, wherein the first and second file formats and the first and second plug-ins configured to process the first and second file formats, respectively, are developed by one or more third parties.

6. The computer-readable medium of claim 1, wherein the application and operating system are configured to download additional plug-ins configured to convert files having additional respective 3D file formats from an online application store.

7. The computer-readable medium of claim 1, wherein the first and second plug-ins perform one or more enhancements to the common 3D description.

8. The computer-readable medium of claim 1, wherein the first and second files having the first and second 3D file formats, respectively, are selected from a file list of the application and the common 3D description is previewed on a viewer pane of the application.

9. The computer-readable medium of claim 1, wherein the first and second plug-ins are configured to generate the common 3D description to be manipulated by the application or the operating system.

10. An electronic device, comprising:
a display;
one or more memories; and
one or more processors configured to run an operating system and a plurality of applications stored in the one or more memories, wherein the plurality of applications are configured to preview and/or manipulate three-dimensional (3D) assets having non-natively recognized 3D file formats by passing the 3D assets to respective plug-ins installed in the operating system or the plurality of applications, the plug-ins configured to:
read the respective non-natively recognized 3D file formats;
convert the 3D asset to a common 3D description that includes 3D model information and that is readable by a calling application; and
return the common 3D description to the calling application or operating system for previewing and/or manipulating.

11. The electronic device of claim 10, wherein the 3D model information described by the common 3D description comprises geometric information, animation information, lighting information, camera position information, texture information, physic properties information, or any combination thereof.

12. The electronic device of claim 10, wherein the operating system and the plurality of applications are configured to determine whether a plug-in configured to read the non-natively recognized 3D file format is installed and to obtain an appropriate plug-in from an online application store via a network interface if the plug-in is not installed.

13. The electronic device of claim 10, wherein the application comprises a file management application comprising a file list that includes one or more 3D assets having one or more different non-natively recognized 3D file formats and a viewer pane configured to preview the contents of a 3D asset selected from the file list on the display.

14. The electronic device of claim 10, wherein the application and the operating system is configured to apply defaults to missing attribute values from the common 3D description returned by the plug-ins.

15. The electronic device of claim 10, wherein the common 3D description comprises a unified application programming interface format enhanced for the operating system.

16. A non-transitory, computer-readable medium having instructions stored thereon, wherein the instructions are configured to cause a processor to:
display a graphical user interface (GUI) of an application comprising a file list and a viewer pane, the application configured to preview contents of a file having a non-native three-dimensional (3D) file format that is selected from the file list in the viewer pane by:
identifying a plug-in installed in an operating system or the application, the plug-in configured to process files having the non-native 3D file format;
passing the file to the plug-in configured to process files having the non-native 3D file format;
converting the file, via the plug-in, to a common 3D description describing 3D model information that is readable by the application; and
returning the common 3D description to the application for previewing in the viewer pane of the GUI.

17. The computer-readable medium of claim 16, wherein the file list comprises a plurality of files having a plurality of different non-native 3D file formats and the application is configured to preview the plurality of files by passing each of the plurality of files having a different non-native 3D file format to a respective plug-in configured to convert each respective 3D file format to a common 3D description.

18. The computer-readable medium of claim 16, wherein the application is configured to apply defaults to the common 3D description as applicable.

* * * * *